US012453765B2

(12) United States Patent
Jarvis et al.

(10) Patent No.: US 12,453,765 B2
(45) Date of Patent: Oct. 28, 2025

(54) INTRINSIC SYSTEM FOR VIRAL VECTOR TRANSGENE REGULATION

(71) Applicant: THE VACCINE GROUP LIMITED, Plymouth (GB)

(72) Inventors: Michael Jarvis, Devon (GB); Alec Redwood, Crawley (AU)

(73) Assignee: THE VACCINE GROUP LIMITED, Plymouth (GB)

( * ) Notice: Subject to any disclaimer, the term of this patent is extended or adjusted under 35 U.S.C. 154(b) by 917 days.

(21) Appl. No.: 17/607,573

(22) PCT Filed: May 1, 2020

(86) PCT No.: PCT/EP2020/062196

§ 371 (c)(1),
(2) Date: Oct. 29, 2021

(87) PCT Pub. No.: WO2020/221923

PCT Pub. Date: Nov. 5, 2020

(65) Prior Publication Data

US 2022/0202925 A1 Jun. 30, 2022

(30) Foreign Application Priority Data

May 1, 2019 (GB) ...................................... 1906104

(51) Int. Cl.

| | |
|---|---|
| ***C12N 15/86*** | (2006.01) |
| ***A61K 39/00*** | (2006.01) |
| ***A61K 39/12*** | (2006.01) |
| ***C12N 15/861*** | (2006.01) |
| ***C12N 15/863*** | (2006.01) |
| ***C12N 15/864*** | (2006.01) |
| ***C12N 15/869*** | (2006.01) |

(52) U.S. Cl.

CPC .............. *A61K 39/12* (2013.01); *A61K 39/00* (2013.01); *A61K 39/0011* (2013.01); *C12N 15/86* (2013.01); *A61K 2039/5256* (2013.01); *A61K 2039/552* (2013.01); *C12N 2710/16134* (2013.01); *C12N 2710/16143* (2013.01); *C12N 2710/16162* (2013.01)

(58) Field of Classification Search

None

See application file for complete search history.

(56) References Cited

U.S. PATENT DOCUMENTS

| | | | |
|---|---|---|---|
| 5,093,258 A | 3/1992 | Cohen et al. |
| 2018/0282378 A1 | 10/2018 | Frueh et al. |

FOREIGN PATENT DOCUMENTS

| | | |
|---|---|---|
| DE | 19709512 | 9/1998 |
| WO | 20200221923 | 5/2020 |

OTHER PUBLICATIONS

Jolly D. Viral vector systems for gene therapy. Cancer Gene Ther. Mar. 1994;1(1):51-64. PMID: 7621239.*

Duch et al. Transgene stability for three replication-competent murine leukemia virus vectors. Gene 329 (2004) 61-69.*

Duch et al. An RNA secondary structure bias for non-homologous reverse transcriptase-mediated deletions in vivo. Nucleic Acids Research, 2004, 32(6): 2039-2048.*

Examination Report received for United Kingdom Patent Application No. GB2006476.2, mailed on Nov. 22, 2022, 03 pages.

Examination Report received for United Kingdom Patent Application No. GB2006476.2, mailed on May 23, 2023, 03 pages.

International Preliminary Report on Patentability received for International Patent Application No. PCT/EP2020/062196, mailed on Nov. 11, 2021, 7 pages.

Im et al., "Recombination-deletion between homologous cassettes in retrovirus is suppressed via a strategy of degenerate codon substitution", Mol Ther Methods Clin Dev., vol. 9, Jul. 2014, pp. 1-8.

First Office Action for Chinese Patent Application No. 202080032795.8, mailed Jan. 27, 2024, 23 pages including English translation.

L Andrew Ball, "High-Frequency Homologous Recombination in Vaccinia Virus DNA", Journal Of Virology, vol. 61, Issue 6, Jun. 1987, pp. 1788-1795.

First Search Report for Chinese Patent Application No. 202080032795.8, mailed Jan. 27, 2024, 2 Pages.

Steinwaerder, et al. "Generation of Adenovirus Vectors Devoid of All Viral Genes by Recombination between Inverted Repeats" Journal of Virology; vol. 73 No. 11; pp. 9303-9313 Nov. 1, 1999.

Duch, et al. "Transgene stability for three replication-competent murine leukemia virus vectors" Gene 329 (2004) 61-69 2004.

Jolly, Douglas "Viral vector systems for gene therapy" Viagene, Inc. pp. Mar. 1-14, 1991.

Purcell, Patrick, MD. "Great Britain application No. GB2006476.2—Search report" Great Britain Intellectual Property Office Nov. 20, 2020.

Mauhin, Viviane "International Search Report—PCT application No. PCT/EP2020/062196" pp. Aug. 26, 2020.

* cited by examiner

*Primary Examiner* — Nianxiang Zou

(74) *Attorney, Agent, or Firm* — Nicholas J. Landau; Maynard Nexsen PC

(57) ABSTRACT

A method for the regulated removal of heterologous genetic material from disseminating viral vaccine vectors is provided.

4 Claims, 10 Drawing Sheets

Figure 1:
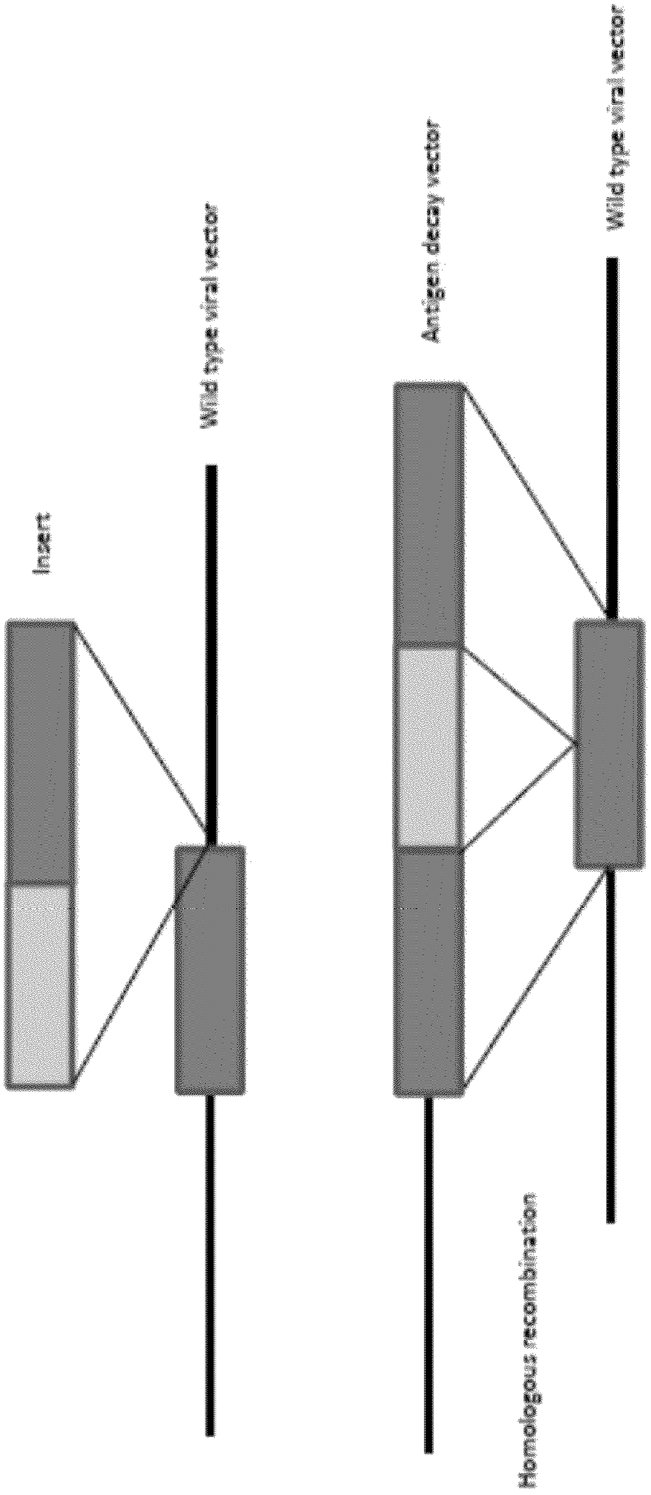
Figure 3:
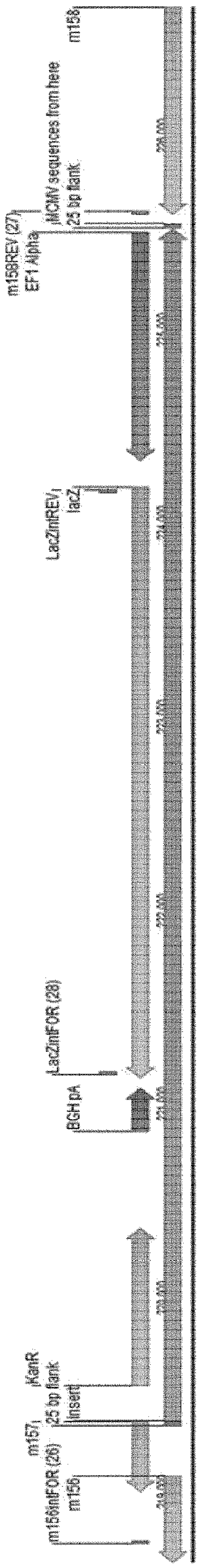
Figure 4:
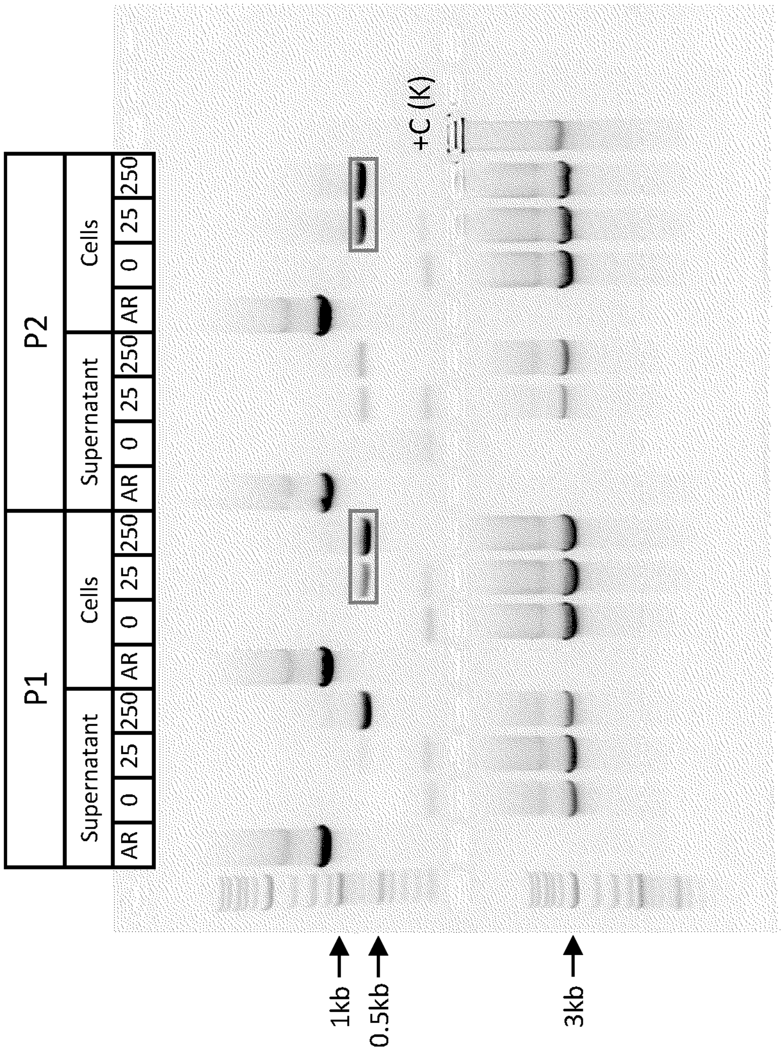
Figure 5:
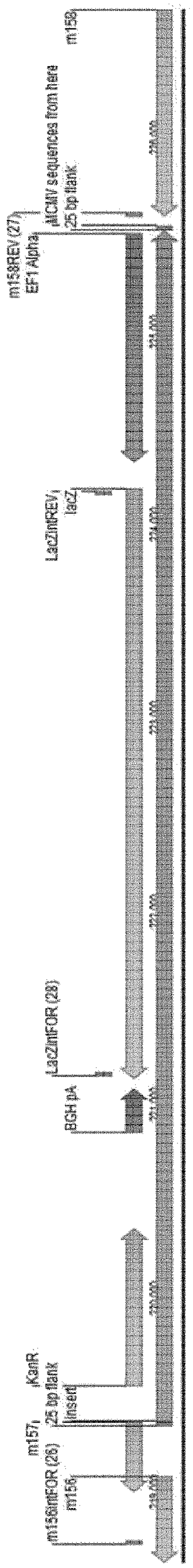
Figure 6:
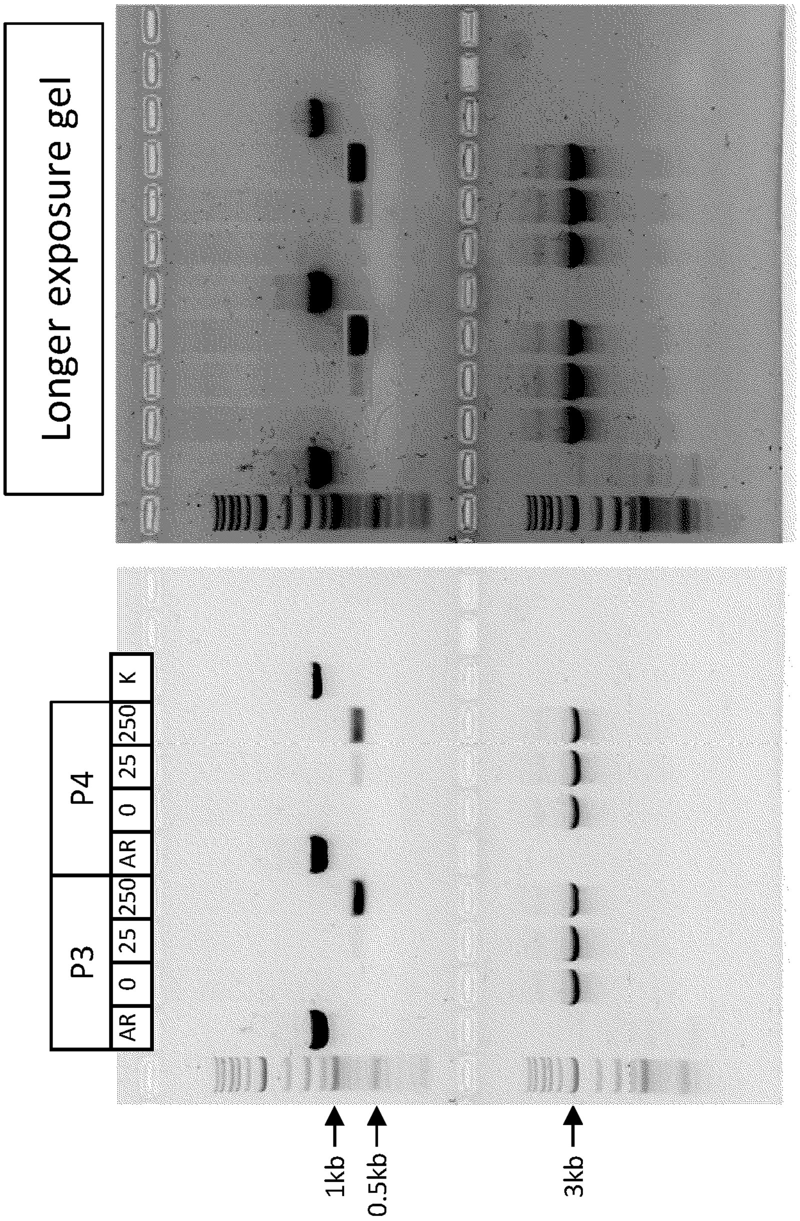
Figure 7A:
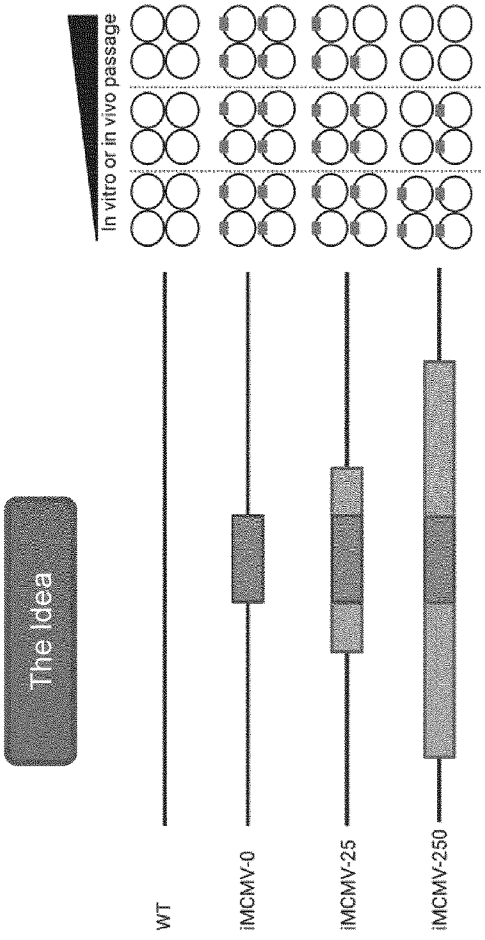
Figure 7B:
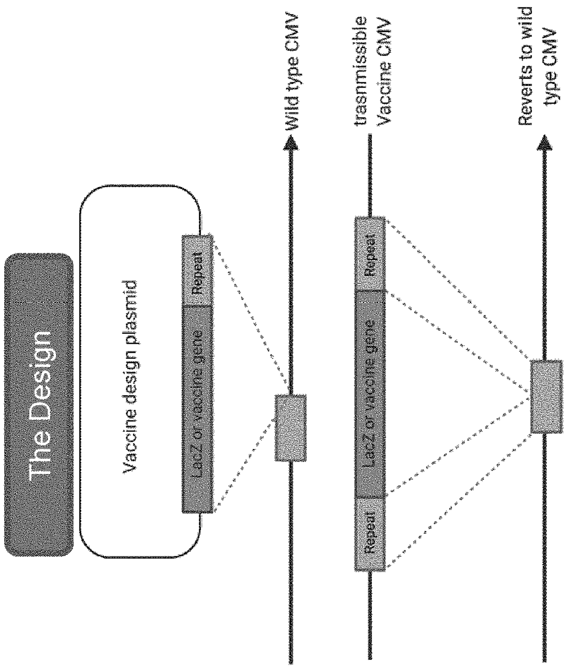
Figures 7C, 7D:
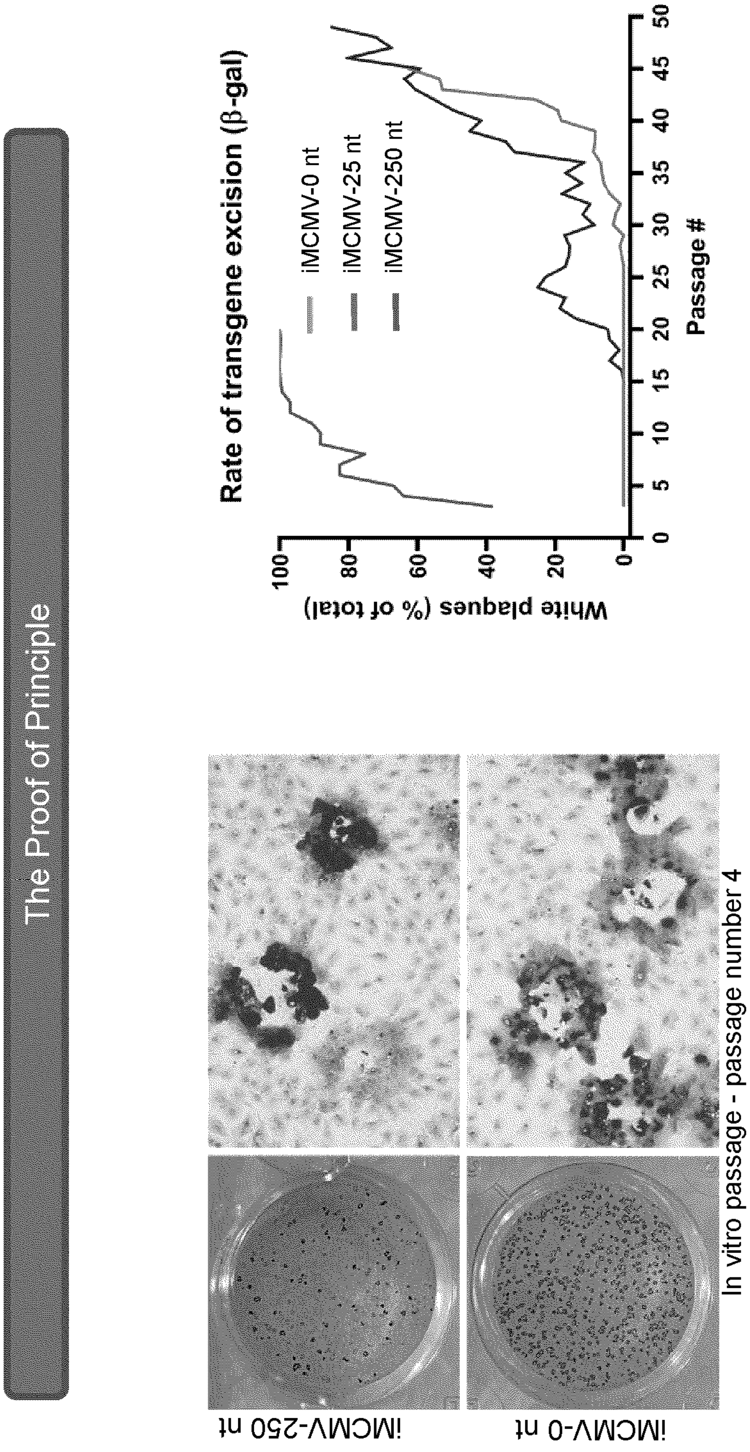
Figure 8A:
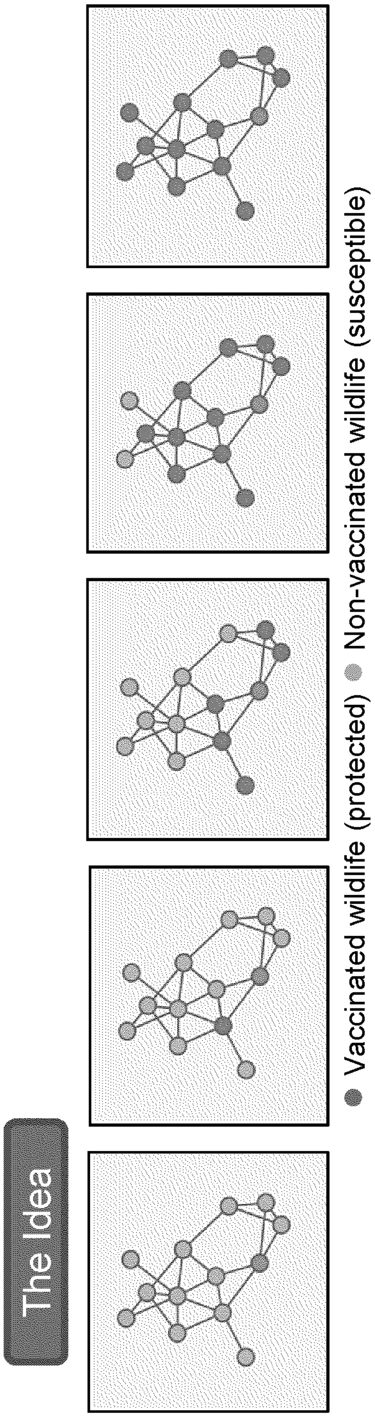

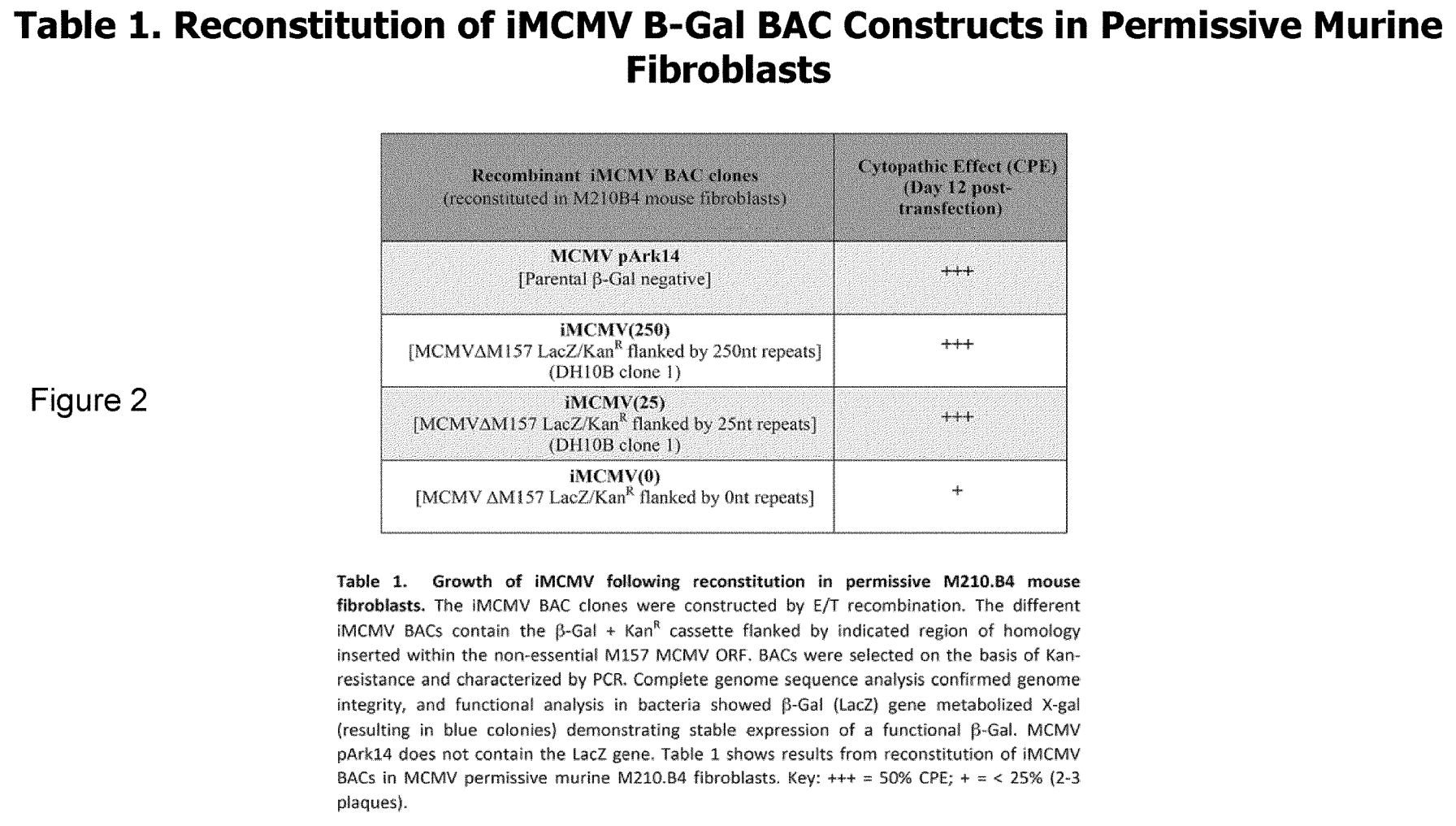

Table 1. Reconstitution of iMCMV B-Gal BAC Constructs in Permissive Murine Fibroblasts

Figure 2

| **Recombinant iMCMV BAC clones** (reconstituted in M210B4 mouse fibroblasts) | **Cytopathic Effect (CPE) (Day 12 post-transfection)** |
|---|---|
| **MCMV pArk14** [Parental β-Gal negative] | +++ |
| **iMCMV(250)** [MCMVΔM157 LacZ/$Kan^R$ flanked by 250nt repeats] (DH10B clone 1) | +++ |
| **iMCMV(25)** [MCMVΔM157 LacZ/$Kan^R$ flanked by 25nt repeats] (DH10B clone 1) | +++ |
| **iMCMV(0)** [MCMV ΔM157 LacZ/$Kan^R$ flanked by 0nt repeats] | + |

Table 1. Growth of iMCMV following reconstitution in permissive M210.B4 mouse fibroblasts. The iMCMV BAC clones were constructed by E/T recombination. The different iMCMV BACs contain the β-Gal + $Kan^R$ cassette flanked by indicated region of homology inserted within the non-essential M157 MCMV ORF. BACs were selected on the basis of Kan-resistance and characterized by PCR. Complete genome sequence analysis confirmed genome integrity, and functional analysis in bacteria showed β-Gal (LacZ) gene metabolized X-gal (resulting in blue colonies) demonstrating stable expression of a functional β-Gal. MCMV pArk14 does not contain the LacZ gene. Table 1 shows results from reconstitution of iMCMV BACs in MCMV permissive murine M210.B4 fibroblasts. Key: +++ = 50% CPE; + = < 25% (2-3 plaques).

Loss of LacZ/Kn cassette in virus at P1 and P2

Key: P=Passage #, AR and K are controls (BAC or viral DNA, respectively), 0=no repeat sequence, 25 = 25 bp repeat, 250 = 250 bp repeat

Loss of LacZ/Kn cassette in virus at P3 and P4

Key: P=Passage #, AR and K are controls (BAC or viral DNA, respectively), 0=no repeat sequence, 25 = 25 bp repeat, 250 = 250 bp repeat

Figure 8B

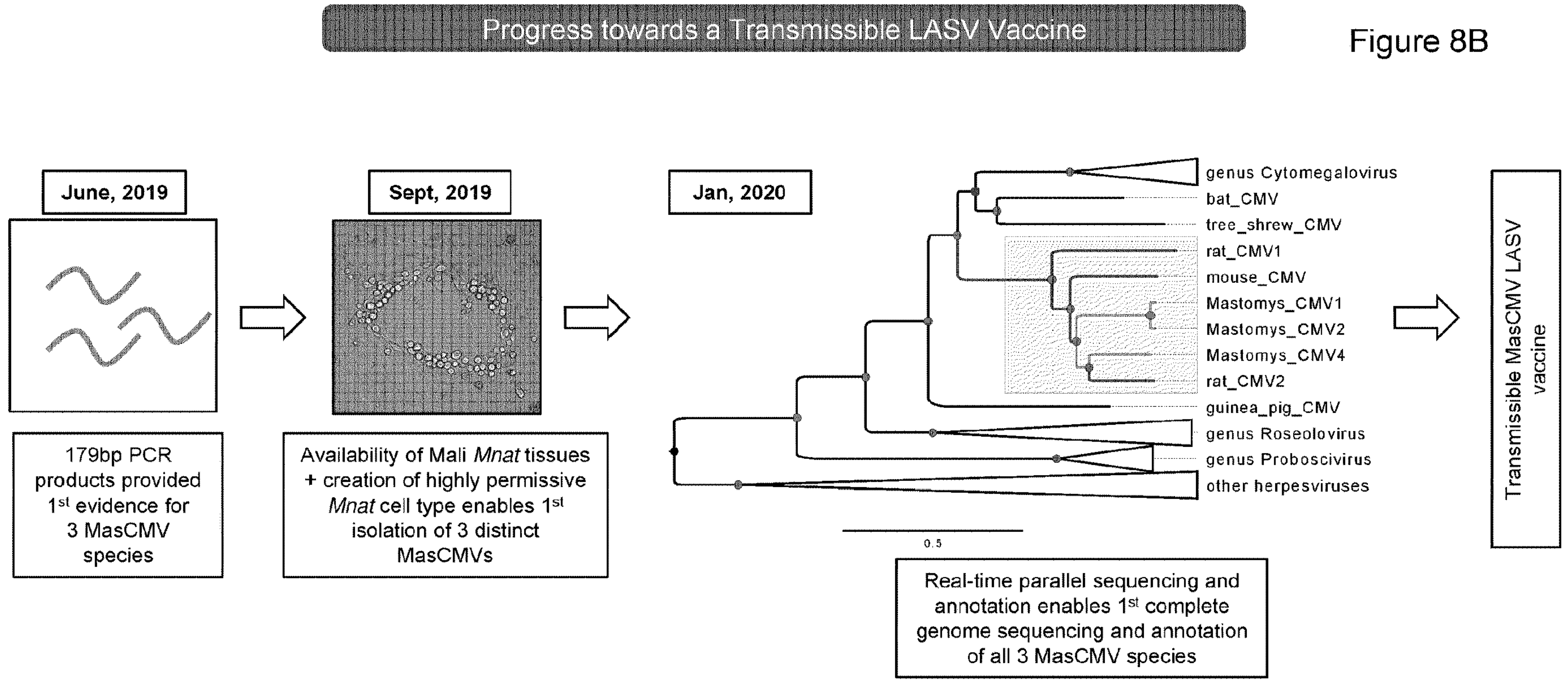

- High level of MasCMV infection in *Mnat* wildlife reservoir (at least 40%) – level sufficient to control LASV.
- Multiple MasCMV infections in single animals common – prior immunity doesn't block MasCMV reinfection.
- Achievement of 1st Major Milestone (MasCMV isolation and characterization) enables movement to 2nd Major Milestone (development of a prototype transmissible MasCMV-based LASV vaccine).

INTRINSIC SYSTEM FOR VIRAL VECTOR TRANSGENE REGULATION

CROSS-REFERENCE TO RELATED APPLICATIONS

This application is a national stage under 35 U.S.C. 371 of International Application No. PCT/EP2020/062196 having an international filing date of 1 May 2020. International Application No. PCT/EP2020/062196 cites the priority of United Kingdom Patent Application No. 1906104.3, filed on 1 May 2019.

The present invention relates generally to a system allowing decayed transgene expression in viral vectors (fully replicating and attenuated) being used as conventional and disseminating vaccines or as gene-replacement vectors.

Viral vaccine vectors can be used to generate immune responses to antigens presented by recombinantly expressed transgenes. Viral vectors allow direct delivery of genes encoding immunogenic proteins (i.e. antigens) directly into host cells whilst simultaneously inducing immunity to the encoded antigens. In addition to conventional vaccines that induce immunity in only the directly vaccinated individual (the term 'individual' relates to any human and non-human animal recipient), disseminating viral vaccines couple the immunogenic attributes of viral vectors with their capacity to transmit from individual to individual through the host population. Disseminating vaccines therefore spread vaccine-derived immunity through the host population as a result of their normal viral transmission. This approach has multiple potential uses including the vaccination and therefore control of zoonotic and epi-zoonotic transmission from animal populations (wild-life and domestic) geographically or economically inaccessible to conventional vaccination. This approach thereby limits subsequent infection of humans/domestic animals whilst simultaneously protecting the animal population involved in transmission from disease.

Viral vectors can also be used as a means to replace genes for which the individual is deficient. In such cases immunity against the transgene is not desired.

Herpesviruses such as cytomegalovirus (CMV) are DNA viruses that are well suited as viral vaccines. They are large viruses that have a relatively large coding capacity and induce robust durable immunity to encoded transgenes, with benign but life-long infection in their respective hosts. As a disseminating vector platform, they have high seroprevalence within their host population indicating high transmission efficacy. They are also highly species specific and therefore can be targeted to specific host populations by use of the relevant herpesvirus species. Although not as extensively explored, herpesviruses may also be used to express genes in a non-immunogenic form to replace or modify genetic deficiencies of the host.

Whilst a potentially highly exploitable viral vector platform, herpesvirus-based vectors may persist in the environment for prolonged periods with unknown consequences. Proposed herein is a mechanism for the production of recombinant viral vectors that express transgenes for definable periods before reversion to their benign wild-type genotype and phenotype.

Viral genome size is constrained by a number of factors including the capacity to efficiently package nucleic acid within the viral capsid. Viruses engineered to encode immunogenic proteins have a larger genome and are therefore at a competitive disadvantage to wild type, parental strains. The transgene in itself may also provide a selective pressure independent of its size towards its loss. The corollary being that antigen expression may be lost over time. However, the timing of this antigen loss is largely indeterminate.

The present invention makes use of this selective pressure on genome size (or other characteristics of the transgene that provide a selective pressure) to produce viral vectors with defined transgene expression decay times.

An aspect of the present invention provides a method for the regulated removal of heterologous genetic material from disseminating viral vaccine vectors, comprising the steps of:

providing a wild-type or parental viral vector which includes a recombinantly engineered duplication of genomic sequence;

providing an antigen expression cassette which comprises a transgene and the necessary regulatory genetic elements for control of transgene expression flanked by copies of a region of the wild-type/parental genomic sequence;

inserting the cassette into the vector so that the transgene is flanked by the wild-type/parental genomic sequence and its duplicated sequence;

whereby homologous recombination subsequently results in removal of the transgene to leave only a single copy of the homology sequence as is normally found within the wild type/parental virus, thereby regenerating the wild type/parental virus genome with an absence of any non-parental virus genetic sequence, selecting a length of the duplicated sequence, in which the rate of transgene removal from the viral genome, and hence reversion of recombinant virus genome to wild-type/parental, is a function of the length of the selected duplicated sequence.

In some embodiments an exogenous transgene is inserted into a viral vector in such a manner that it is flanked by repeated viral sequences allowing directed homologous recombination between repeated sequences and concomitant removal of the inserted transgene.

Recombination resulting in removal of the transgene will leave only a single copy of the flanking homology sequence thereby generating the wild type (parental) virus genome, with the absence of any non-viral genetic sequence.

The rate of transgene removal from the viral genome (period required for reversion of recombinant virus genome to parental) will be a function of one or more of: the specific DNA virus being used, the length of repeat sequence and the size and nature of the inserted transgene.

The length of transgene expression will be definable and variable allowing an intrinsic means for fine tuning of transgene removal. Modulation of decay rate will permit transgene expression appropriate for the vaccination or gene-replacement strategy being deployed and improved safety profiles with reversion of recombinant viruses back to parental wild-type.

This mechanism may be applicable to all DNA virus-based viral vectors.

Some aspects and embodiments of the present invention provide or relate to a method for the rapid removal of heterologous sequences from genetically modified viruses. These may include viruses and viral vectors (replicating or attenuated) for use in:

a. Cancer immunotherapy requiring short-term antigen exposure. Viral vectors would revert back to wild-type rapidly on antigen decay.
b. Vaccination strategies for prevention of bacterial, viral, helminth or fungal infections. Viral vectors would revert back to wild-type rapidly on antigen decay.

c. Alternative vaccine strategies including self-antigens such as those used for immunocontraception. Viral vectors would revert back to wild-type rapidly on antigen decay.

g. Gene replacement, representing an intrinsic method for regulated removal of transgene from virus vectors used for gene-replacement.

According to a further aspect of the present invention there is provided a method for the regulated removal of heterologous genetic material from disseminating viral vaccine vectors, comprising the steps of:

providing a wild-type or parental viral vector which includes a copy (recombinantly engineered duplication) of genomic sequence of a preselected length providing an antigen expression cassette which comprises a transgene and the necessary regulatory genetic elements for control of transgene expression flanked by copies of a region of the wild-type/parental genomic sequence inserting the cassette into the vector so that the transgene is flanked by the wild-type/parental genomic sequence and its copied (duplicated) sequence whereby homologous recombination results in removal of the transgene to leave only a single copy of the homology sequence as is normally found within the wild type/parental virus, thereby regenerating the wild type/parental virus genome with an absence of any non-parental virus genetic sequence, in which the rate of transgene removal from the viral genome, and hence reversion of recombinant virus genome to wild-type/parental, is a function of the length of the duplicated sequence, and the size and nature of the inserted transgene.

A further aspect provides a method for the rapid removal of heterologous sequences from genetically modified viruses, comprising the steps of:

providing a wild-type or parental viral vector which includes a duplicated sequence of the viral genome of a preselected length providing an antigen expression cassette which comprises a transgene and necessary regulatory sequences and a copy of a duplicated region of the wild-type/parental sequence inserting the cassette into the vector so that the transgene is flanked by the wild-type/parental sequence and its copy of a defined size whereby homologous recombination results in removal of the transgene to leave only a single copy of the flanking homology sequence thereby regenerating the wild type/parental virus genome.

A further aspect provides a method for the regulated removal of heterologous genetic material from disseminating viral vaccine vectors, comprising the steps of:

providing a wild-type or parental viral vector which includes a recombinantly engineered duplication of genomic sequence of a preselected length;

providing an antigen expression cassette which comprises a transgene and the necessary regulatory genetic elements for control of transgene expression flanked by copies of a region of the wild-type/parental genomic sequence;

inserting the cassette into the vector so that the transgene is flanked by the wild-type/parental genomic sequence and its duplicated sequence;

whereby homologous recombination results in removal of the transgene to leave only a single copy of the homology sequence as is normally found within the wild type/parental virus, thereby regenerating the wild type/parental virus genome with an absence of any non-parental virus genetic sequence, in which the rate of transgene removal from the viral genome, and hence reversion of recombinant virus genome to wild-type/parental, is a function of the length of the duplicated sequence, and the size and nature of the inserted transgene.

A further aspect provides a method for the rapid removal of heterologous genetic material from disseminating viral vaccine vectors, comprising the steps of:

providing a wild-type or parental viral vector which includes a duplicated sequence of genome of a preselected length providing an antigen expression cassette which comprises a transgene and a copy of the wild-type/parental flanking sequence inserting the cassette into the vector so that the transgene is flanked by the wild-type/parental sequence and its copied (duplicated) region of the genome whereby homologous recombination results in removal of the transgene to leave only a single copy of the flanking homology sequence thereby generating the wild type/parental virus genome with an absence of any non-viral genetic sequence (both in terms of sequence and copy number).

The viral vector may be a herpesvirus-based vector,

The viral vector may be a CMV-based vector.

The CMV-based vector may be selected from a non-exclusive list of: human CMV (HCMV), simian CMV (SCCMV), rhesus CMV (RhCMV), chimpanzee CMV (CCMV) gorilla CMV (GCMV), porcine CMV (PCMV) and rodent CMVs including deer mouse [peromyscus] CMV (PyCMV), Mastomys CMV and murine CMV (MCMV).

The viral vector may comprise additional non-CMV herpesviruses from a non-exclusive list of human herpes simplex virus (HSV), human Epstein-Barr virus (EBV), human Kaposi's Sarcoma virus (KHSV), equine herpesvirus-2 (EHV-2) and mustelid herpesvirus-I (MusHV-I); as well as other DNA viruses, including adenovirus and adeno-associated virus.

A further aspect provides an intrinsic system for viral vector transgene regulation, comprising a viral vector having a transgene flanked by a duplication of viral genome sequence for allowing homologous recombination between repeated sequences and concomitant excision of the transgene and leaving only a single copy of the duplicated flanking region comparable to that found within the wild type/parental genome, in which antigen decay is a function of the length of the duplicated genomic sequence such that the length of transgene expression is definable and variable.

A further aspect provides an intrinsic system for viral vector transgene regulation, comprising a viral vector having a transgene flanked by a duplication of viral genome sequence for allowing homologous recombination between repeated sequences and concomitant excision of the transgene and leaving only a single copy of the duplicated flanking region comparable to that found within the wild type/parental genome, in which antigen decay is a function of the length of the duplicated genomic sequence, the size and nature of the transgene such that the length of transgene expression is definable and variable.

A further aspect provides a viral vector having a transgene flanked by duplicated viral sequences for allowing homologous recombination between the duplicated sequences and concomitant excision of the transgene and leaving only one of the two duplicated sequences thereby returning the virus to wild type/parental genome state, in which antigen decay is a function of the length of the duplicated sequence and the size and nature of the transgene such that the length of transgene expression is definable and variable.

The present invention also provides a vaccine consisting of, comprising or including a vector as described herein.

The present invention also provides a composition comprising a vector or vaccine as described herein and a pharmaceutically acceptable carrier.

It is known that flanking foreign elements with homologous sequence (i.e. identical genomic stretches) will target the intervening foreign element for removal from the viral genome. The present invention is based on the observation that the larger the size of the flanking sequence of homology, the faster the rate of removal of the foreign element. Hence kinetic control of foreign genetic elements from a viral genome is facilitated.

The vector may comprise a herpesvirus-based vector, for example a CMV-based vector.

The CMV-based vector may be selected from a non-exclusive list of human CMV (HCMV), simian CMV (SCCMV), rhesus CMV (RhCMV), chimpanzee CMV (CCMV) gorilla CMV (GCMV), porcine CMV (PCMV) and rodent CMVs including deer mouse [peromyscus] CMV (PyCMV) and murine CMV (MCMV).

The viral vector may comprise additional non-CMV herpesviruses from a non-exclusive list of human herpes simplex virus (HSV), human Epstein-Barr virus (EBV), human Kaposi's Sarcoma virus (KHSV), equine herpesvirus-2 (EHV-2) and mustelid herpesvirus-1 (MusHV-1), bovine herpesvirus-4; as well as other DNA viruses, including adenovirus and adeno-associated virus.

The present invention also provides a composition comprising the vaccine or vector as described herein and a pharmaceutically acceptable carrier.

The present invention also provides a vaccine consisting of, comprising or including a vector as described herein.

Different aspects and embodiments of the invention may be used separately or together.

Further particular and preferred aspects of the present invention are set out in the accompanying independent and dependent claims. Features of the dependent claims may be combined with the features of the independent claims as appropriate, and in combination other than those explicitly set out in the claims. Each aspect can be carried out independently of the other aspects or in combination with one or more of the other aspects.

The present invention will now be more particularly described, by way of example, with reference to the accompanying drawings.

The example embodiments are described in sufficient detail to enable those of ordinary skill in the art to embody and implement the systems and processes herein described. It is important to understand that embodiments can be provided in many alternative forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

PAGE I

Referring to FIG. 1 of the drawings, the exogenous transgene is inserted into the viral vector in such a manner that it is flanked by repeated viral sequences allowing directed homologous recombination between repeated sequences and concomitant removal of the inserted transgene.

Recombination resulting in removal of the transgene will leave only a single copy of the flanking homology sequence thereby generating the wild type (parental) virus genome, with the absence of any non-viral genetic sequence.

The rate of transgene removal from the viral genome (period required for reversion of recombinant virus genome to parental) will be a function of the specific DNA virus being used, the length of repeat sequence and the size and nature of the inserted transgene.

The length of transgene expression will be definable and variable allowing an intrinsic means for fine tuning of transgene removal. Modulation of decay rate will permit transgene expression appropriate for the vaccination or gene-replacement strategy being deployed and improved safety profiles with reversion of recombinant viruses back to parental wild-type.

This mechanism is applicable to all DNA virus-based viral vectors.

This principle can be applied, for example, to a method for the rapid removal of heterologous sequences from genetically modified viruses.

These may include viruses and viral vectors (replicating or attenuated) for use in:

a. Cancer immunotherapy requiring short-term antigen exposure. Viral vectors would revert back to wild-type rapidly on antigen decay.
b. Vaccination strategies for prevention of bacterial, viral, helminth or fungal infections. Viral vectors would revert back to wild-type rapidly on antigen decay.
c. Alternative vaccine strategies including self-antigens such as those used for immunocontraception. Viral vectors would revert back to wild-type rapidly on antigen decay.
g. Gene replacement, representing an intrinsic method for regulated removal of transgene from virus vectors used for gene-replacement.

Embodiments of the present invention also provides a method for the rapid removal of heterologous genetic material from disseminating viral vaccine vectors.

These may include, but are not limited to, viruses and viral vectors for use in animal populations where spread of viral vector rather than direct inoculation is advantageous, but where a non-permanent presence of the recombinant virus within the environment is desirable. Non-exclusive examples are given below:

a. Captive animal populations requiring short-term vaccination/dissemination (as above, bacterial-, viral-, fungal-, helminth- or self-antigens) followed by reversion of viral vector to parental virus.
b. Companion animals requiring short-term vaccination/dissemination (as above, bacterial-, viral-, fungal-, helminth- or self-antigens) followed by reversion of viral vector to parental virus.

c. Livestock animals requiring short-term vaccination/dissemination (as above, bacterial-, viral-, fungal- helminth- or self-antigens) followed by reversion of viral vector to parental.

e. Wild animals requiring short-term vaccination/dissemination (as above, bacterial-, viral-, fungal- or helminth-self-antigens) followed by reversion of viral vector to parental.

Embodiments of the present invention also provides a method for the delayed removal of heterologous genetic material from disseminating viral vaccine vectors.

This would include but is not limited to examples given above.

PAGE 2

Technical Progress/Highlights: TA2 WPIB
Intrinsic Attenuation

The results provided in the FIGURES demonstrate that homologous recombination can be used to remove expressed transgenes as described in FIG. 1.

LacZ cassette (transgene) remains within a proportion of virions for at least 4 passages with a repeat length of 250 bp and is not lost from control virions with 0 bp repeat length consistent with hypothesis.

Rates of loss are influenced by flanking homology length, which is quantified in subsequent experiments (see below).

TABLE I

Reconstitution of iMCMV B-Gal BAC Constructs in Permissive Murine Fibroblasts

| Recombinant iMCMV BAC clones (reconstituted in M210B4 mouse fibroblasts) | Cytopathic Effect (CPE) (Day 12 post-transfection) |
|---|---|
| MCMV pArk14 [Parental β-Gal negative] | +++ |
| iMCMV(250) [MCMVΔM157 LacZ/Kan$^R$ flanked by 250 nt repeats] (DH10B clone 1) | +++ |
| iMCMV(25) [MCMVΔM157 LacZ/Kan$^R$ flanked by 25 nt repeats] (DH10B clone 1) | +++ |
| iMCMV(0) [MCMV ΔM157 LacZ/Kan$^R$ flanked by 0 nt repeats] | + |

Table 1. Growth of iMCMV following reconstitution in permissive M210.B4 mouse fibroblasts. The iMCMV BAC clones were constructed by E/T recombination. The different iMCMV BACs contain the β-Gal + Kan$^R$ cassette flanked by indicated region of homology inserted within the non-essential M157 MCMV ORF. BACs were selected on the basis of Kan-resistance and characterized by PCR. Complete genome sequence analysis confirmed genome integrity, and functional analysis in bacteria showed β-Gal (LacZ) gene metabolized X-gal (resulting in blue colonies) demonstrating stable expression of a functional β-Gal. MCMV pArk14 does not contain the LacZ gene. Table 1 shows results from reconstitution of iMCMV BACs in MCMV permissive murine M210.B4 fibroblasts. Key: +++ = 50% CPE; + = <25% (2-3 plaques).

PAGE 3 & 4

Pages 3 and 4 of the drawings relate to the loss of a LacZ/KN cassette in a virus at P1 and P2.

LacZ is present in 0 nt, 25 nt and 250 nt MCMV Bgal strains at P1 and P2.

Red highlighted bands (at right on page 4) show that at P1 there is already excision of LacZ/Kn between 25 nt and 250 nt flank sequences.

Sequencing confirmed that the highlighted bands corresponds to excised LacZ/Kn.

Loss of the LacZ/Kn is not detected in Ont flank samples.

M PCR with primers m156intFOR and m 158REV:

vARK 14 (WT): 1326 bp 25 nt flank with insert: 6884 bp 250 nt flank with insert: 7109 bp lacZ/Kn excised between repeat sequences: 702 bp L PCR with primers LacZintFOR and LacZintREV: 3024 bp

PAGES 5 & 6

Pages 5 and 6 of the drawings relate to loss of LacZ/KN cassette in a virus at P3 and P4.

LacZ is present in 0 nt, 25 nt and 250 nt MCMV Bgal strains at P3 and P4.

Red highlighted bands (right on page 6) corresponds to excision of LacZ/Kn between 25 nt and 250 nt flank sequences.

Rate of gene loss is higher in virus with 250 versus 25 bp repeats.

Loss of the LacZ/Kn is not detected in Ont flank samples.

Take home message: LacZ cassette is retained for at least 4 passages in both 25 and 250 bp repeat viruses. Homologous recombination is occurring and leads to loss of LacZ in a proportion of virus. Rate of loss is determined by length of repeat sequence.

PAGES 7 & 8

Intrinsic decay: A simple tool for robust biological control of a transmissible vaccine (WP2 TAIB)

A) Principle of repeat sequence based intrinsic decay. The rate of homologous recombination is dictated by length of the repeat sequence (and capacity for viral encapsidation, a function of total genome size) in the virus, longer repeats should lead to more rapid loss of the transgene (or LacZ).

B. Design of iMCMV strains showing plasmid and mechanism of homologous recombination leading to reversion to wild type (WT) sequence containing only a single “repeat” sequence.

Homologous recombination between the repeat sequences leads to loss of intervening sequence and one repeat.

C. Staining for retention of LacZ (viral plagues retaining LacZ stain blue following the addition of betagalactosidase). Shown is passage 4 virus titrations for iMCMV-250 and iMCMV-0.

D. Quantification of transgene (LacZ) loss over serial passage. iMCMV-250 variant has complete transgene loss by passage 13, whilst iMCMV-25 retains the transgene for multiple passages. iMCMV-25 eventually loses expression at a rate slightly faster than virus without repeat sequences (iMCMV-0). We could reasonably expect more rapid transgene loss in vivo due to greater selective pressure. We will be testing new iMCMV strains with, 0, 25, 50, 75 and 100 bp repeats in vivo whilst also assessing immunogenicity, and loss of immunogenicity, to the nominal antigen NP from LCMV. We will also be assessing the role that competition between WT and iMCMV strains play in the role of transgene loss. In this instance competition may select for WT leading to loss of iMCMV strains via competition, i.e. independent of on-going recombination.

PAGES 9 & 10

Transmissible vaccination: A tool to prevent the host species jump of zoonotic viruses from animals into humans (WPI)

A) Principle of transmissible vaccination. Most highly pathogenic viruses in humans come from wildlife. Wildlife vaccination can prevent the jump into humans, BUT inaccessibility and harsh conditions prevent use of conventional (directly administered) vaccines except on rare occasions (e.g. rabies). Transmissible vaccination solves the problem of providing high vaccine coverage in inaccessible wildlife populations living in harsh environments.

B) Transmissible LASV Vaccine. A transmissible vaccine against Lassa virus (LASV) for use in the wild rat (Mastomys natalensis; Mnat) reservoir provides a 'Proof-of-Concept' with direct 'Real-World' impact. Mastomys cytomegalovirus (MasCMV) will be used as the transmissible vaccine. TIMELINE. June, 2019: Based on ability to amplify of a 179 bp section of the 230,000 bp genome, PCR had shown the presence of MasCMV in Mnat tissues. September, 2019: Availability of tissues from an independently funded project at RML combined with development of a highly permissive Mnat epithelial cell line enabled isolation of 3 distinct species of MasCMV. This sensitive co-culturing assay showed MasCMV infection to be high in the wild Mnat population (at least 40%) and coinfection was common, indicating that prior immunity to MasCMV (even for very closely related viruses) did not prevent re-infection: these are two characteristics important for use as a transmissible vaccine. January, 2020: Real-time full-length genome sequencing has provided the most extensive characterization of any CMV in its native wild animal population. Key to the development of MasCMV as a transmissible vaccine, genome characterization has enabled movement to the second stage of the project where the MasCMVs will be cloned as infectious bacterial artificial chromosomes such that they can be genetically manipulated to construct a transmissible vaccine for LASV.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

The invention claimed is:

1. A method for the regulated removal of heterologous genetic material from disseminating DNA viral vaccine vectors, comprising:

providing a wild-type or parental DNA viral vector which includes a wild-type or parental genomic sequence and a recombinantly engineered duplication of the said wild-type or parental genomic sequence;

providing a transgene expression cassette which comprises a transgene and the necessary regulatory genetic elements for control of transgene expression; and inserting the transgene expression cassette into the DNA viral vector so that the transgene is flanked by the wild-type or parental genomic sequence and the recombinantly engineered duplication of wild-type or parental genomic sequence;

whereby homologous recombination between the flanking wild-type or parental genomic sequences subsequently results in removal of the transgene and restoration of only a single copy of the wild-type or parental genomic sequence as is normally found within a wild type or parental DNA virus, thereby regenerating the wild-type or parental DNA virus genome with an absence of any non-parental virus genetic sequence;

wherein the method comprises a step of selecting a length for the wild-type or parental genomic sequence to be duplicated; and in which the rate of transgene removal from the viral genome, and hence reversion of recombinant virus genome to wild-type or parental, is a function of the length of the selected duplicated wild-type or parental genomic sequence.

2. A method for the regulated removal of heterologous genetic material from DNA viral vaccine vectors, comprising:

providing a wild-type or parental DNA viral vector which includes a recombinantly engineered duplication of genomic sequence of a preselected length;

providing an expression cassette which comprises a transgene and the necessary regulatory genetic elements for control of transgene expression; and inserting the cassette into the DNA viral vector so that the transgene is flanked by the wild-type or parental genomic sequence and its duplicated sequence;

whereby homologous recombination results in removal of the transgene to leave only a single copy of the genomic sequence as is normally found within a wild type or parental virus, thereby regenerating the wild type or parental virus genome with an absence of any non-parental virus genetic sequence; and in which the rate of transgene removal from the viral genome, and hence reversion of recombinant virus genome to wild-type or parental, is a function of the length of the duplicated sequence.

3. The method of claim 2, being an intrinsic method for regulated removal of transgene from virus vectors used for gene-replacement.

4. The method of claim 2, being a method of cancer immunotherapy requiring short-term antigen exposure, whereby a viral vector reverts back to wild-type rapidly on antigen decay.

* * * * *